(12) United States Patent
Chen et al.

(10) Patent No.: US 11,135,956 B2
(45) Date of Patent: Oct. 5, 2021

(54) VEHICLE CONSOLE ASSEMBLY WITH HINGE ASSEMBLY AND METHOD OF ASSEMBLY

(71) Applicant: Ford Global Technologies, LLC, Dearborn, MI (US)

(72) Inventors: Shiran Chen, Farmington Hills, MI (US); Francesco DiDato, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 16/547,992

(22) Filed: Aug. 22, 2019

(65) Prior Publication Data
US 2021/0053473 A1 Feb. 25, 2021

(51) Int. Cl.
 *B60N 2/75* (2018.01)
 *E05D 3/02* (2006.01)
 *B60R 7/04* (2006.01)
 *E05B 83/32* (2014.01)

(52) U.S. Cl.
CPC ............... *B60N 2/793* (2018.02); *B60R 7/04* (2013.01); *E05B 83/32* (2013.01); *E05D 3/02* (2013.01); *E05Y 2900/538* (2013.01)

(58) Field of Classification Search
CPC .. B60N 2/793; E05D 3/02; B60R 7/04; E05B 83/32; E05Y 2900/538
USPC .................. 296/37.8, 24.34, 37.1, 1.09, 153
See application file for complete search history.

(56) References Cited

U.S. PATENT DOCUMENTS

| 6,033,015 A * | 3/2000 | Husted ................... B60N 2/793 297/188.19 |
| 6,832,412 B2 * | 12/2004 | Kim .......................... E05F 5/00 16/354 |
| 8,943,650 B2 * | 2/2015 | Anderson ............. E05D 11/082 16/342 |
| 9,731,655 B2 * | 8/2017 | Nakasone ................. B60R 7/06 |
| 10,071,662 B2 * | 9/2018 | Choi ..................... E05F 1/1223 |
| 2009/0106938 A1 * | 4/2009 | Mori ..................... E05F 1/1215 16/277 |
| 2013/0106121 A1 * | 5/2013 | Hasegawa .............. B60N 3/023 292/220 |

(Continued)

FOREIGN PATENT DOCUMENTS

JP 5691496 A2 4/2015
KR 20070060193 A 6/2007
(Continued)

*Primary Examiner* — D Glenn Dayoan
*Assistant Examiner* — E Turner Hicks
(74) *Attorney, Agent, or Firm* — David Coppiellie; Price Heneveld LLP

(57) ABSTRACT

A vehicle console assembly with a hinge assembly includes a console body, an armrest lid, and a pivotable hinge assembly. The console body includes first and second spring arm engagement portions and a pair of slots. The armrest lid includes an armrest lid engagement portion. The pivotable hinge assembly includes a double torsion spring with a center linkage bar that extends outward between a pair of helical coil portions and between first and second hook locking features. The pivotable hinge assembly includes a hinge pin that extends through the pair of helical torsion coil portions of the double torsion spring to connect the pivotable hinge assembly to the console body.

19 Claims, 9 Drawing Sheets

(56) References Cited

U.S. PATENT DOCUMENTS

| | | | |
|---|---|---|---|
| 2016/0090014 A1* | 3/2016 | Dinant | B60N 2/75 297/411.36 |
| 2018/0099590 A1* | 4/2018 | Choi | B60N 2/793 |
| 2018/0209191 A1* | 7/2018 | Selvakumar | B60N 2/753 |
| 2018/0304788 A1* | 10/2018 | Park | B60N 2/75 |
| 2020/0173217 A1* | 6/2020 | Hodgson | B60R 7/06 |
| 2021/0053473 A1* | 2/2021 | Chen | E05D 3/02 |

FOREIGN PATENT DOCUMENTS

| | | |
|---|---|---|
| KR | 20070095538 A | 10/2007 |
| KR | 20160012458 A | 2/2016 |
| KR | 20180001566 U | 5/2018 |

\* cited by examiner

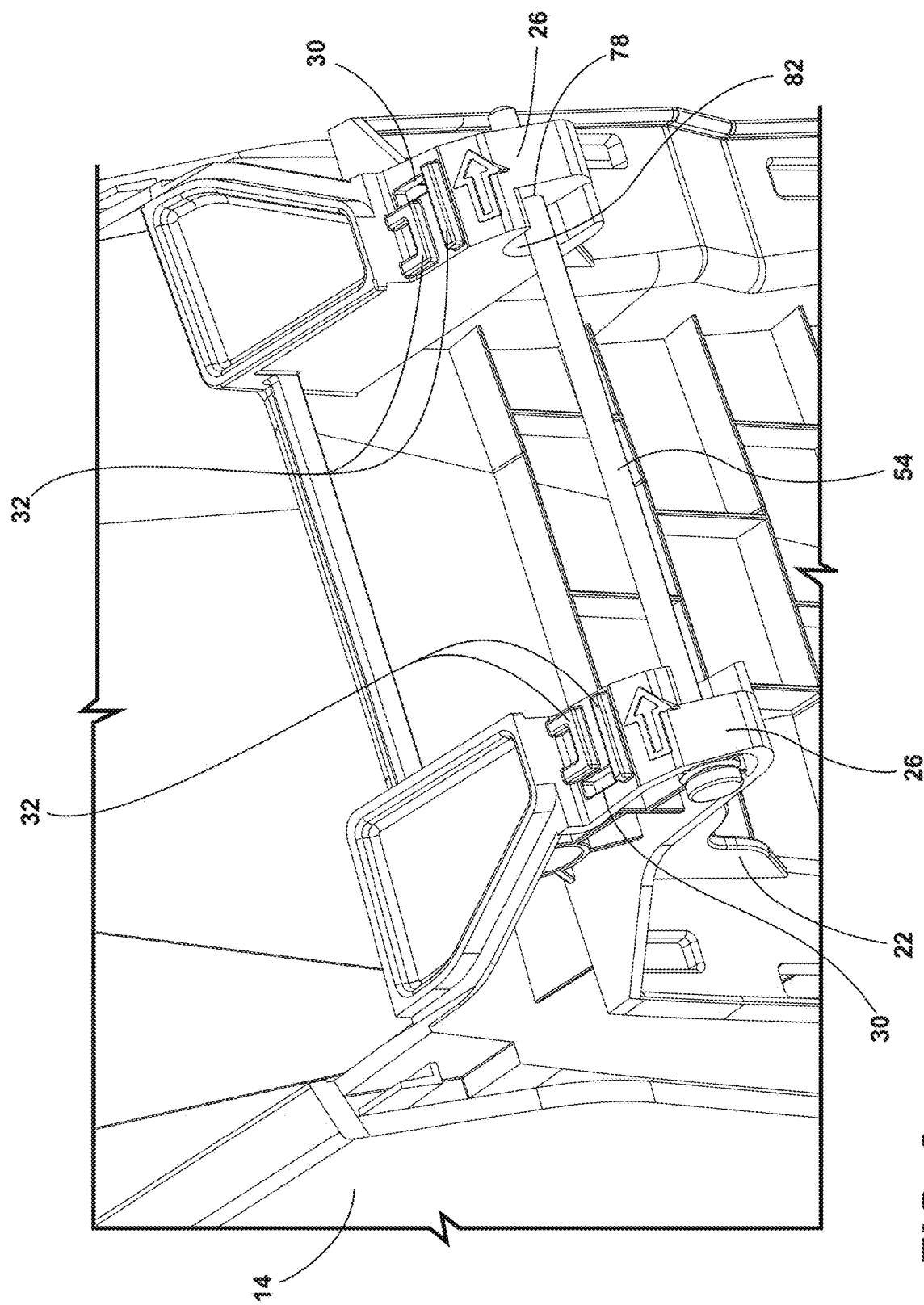

VEHICLE CONSOLE ASSEMBLY WITH HINGE ASSEMBLY AND METHOD OF ASSEMBLY

FIELD OF THE DISCLOSURE

The present disclosure generally relates to a vehicle console assembly. More specifically, the present disclosure relates to a vehicle center console having a hinge assembly that includes a spring and a hinge pin and allows for a simplified assembly process.

BACKGROUND OF THE DISCLOSURE

Vehicles often have center consoles including an armrest lid that allow occupants within the vehicle to rest their arms and access the center console. The armrest lid is typically coupled to the console body by a hinge assembly that is often difficult to install due to its position between the front seats in the passenger compartment of the vehicle.

SUMMARY OF THE DISCLOSURE

According to one aspect of the present disclosure, a vehicle console assembly includes a console body, an armrest lid, and a pivotable hinge assembly that includes a double torsion spring and a hinge pin. The double torsion spring includes a center linkage bar between a pair of helical torsion coil portions and hook locking features at opposite ends of the double torsion spring. The hook locking features operably couple the armrest lid to the console body. The hinge pin extends through the pair of helical torsion coil portions of the double torsion spring and connects to the console body.

According to another aspect of the present disclosure, a vehicle console and armrest hinge assembly includes a console base and armrest lid, and a double torsion spring and hinge pin. The double torsion spring further includes a center linkage bar that extends outward between a pair of helical torsion coil portions and further between a first and second hook locking features disposed on opposite ends of the double torsion spring. The hook locking features couple with the console body, and a hinge pin inserted through the helical torsion coil portions of the double torsion spring and couples the armrest lid to the console base.

According to another aspect of the present disclosure, a method for assembling a vehicle console armrest includes a provided double torsion spring that includes a center linkage bar disposed between a pair of helical torsion coil portions and a first and second hook locking feature disposed on opposite ends of the double torsion spring. The center linkage bar is placed into an armrest lid engagement portion, and the first and second hook locking features are installed through a pair of slots located on a console body. Finally, a hinge pin is extended through the console body and the pair of helical torsion coil portions disposed on the double torsion spring.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 8 is an enlarged perspective view of a center console base showing a pair of slots for double torsion spring arms;

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

Figure 1:
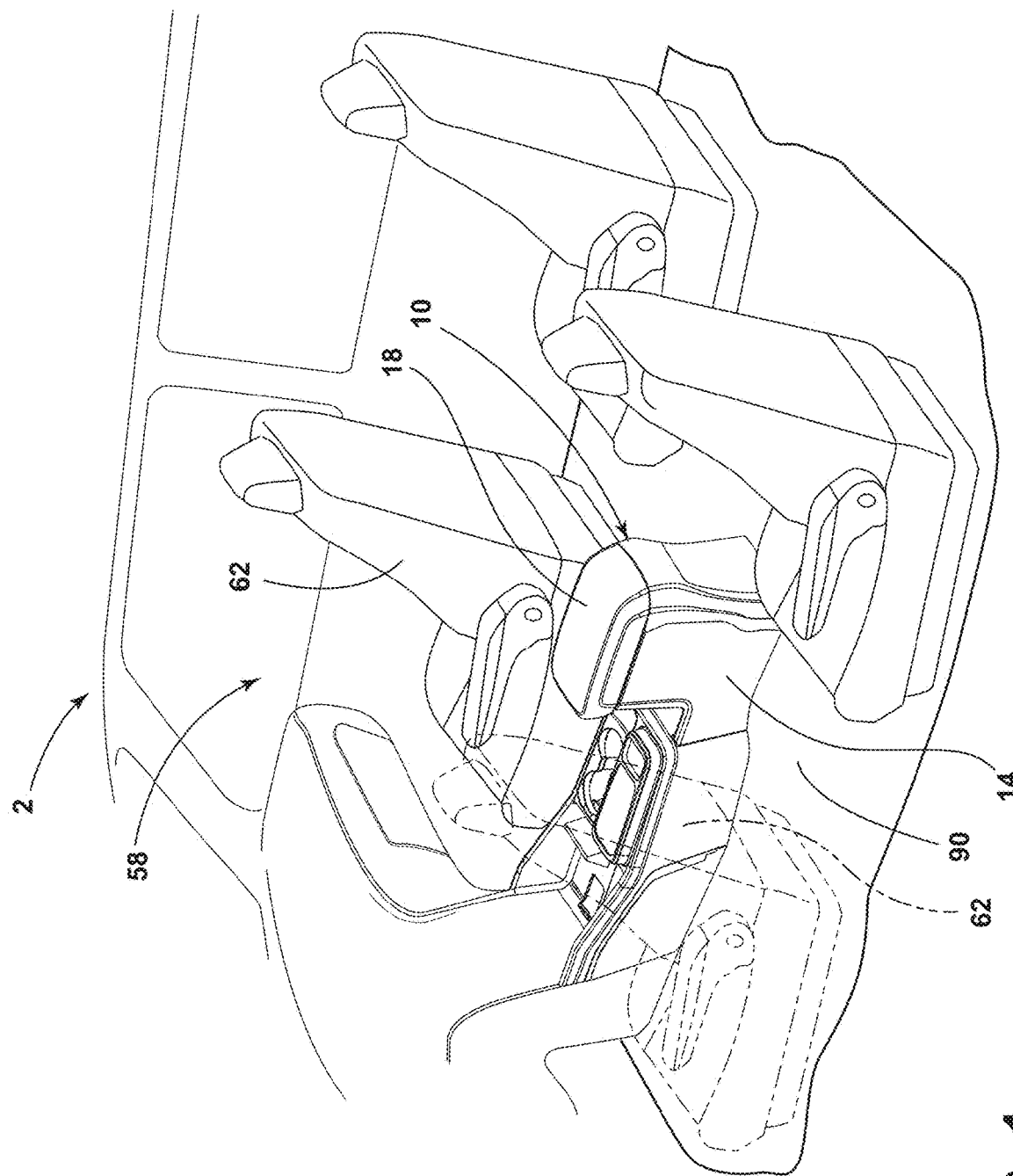
FIG. 1 is a perspective view of an interior passenger compartment of a vehicle having driver and passenger seats and a center console positioned therebetween.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-10, reference numeral 10 generally refers to a vehicle console assembly 10 for a motor vehicle 2. The vehicle console assembly 10 includes a console body 14. The console body 14 may include a first and second spring arm engagement portions 26 and a pair of slots 30. An armrest lid 18 may include an armrest lid engagement portion 22 and may be configured to rotatably couple with the console body 14 via a pivotable hinge assembly 34. The pivotable hinge assembly 34 may include a double torsion spring 38 with a center linkage bar 42, a pair of helical torsion coil portions 46, and first and second hook locking features 50 at opposite ends of the double torsion spring 38. A hinge pin 54 may be extended through the helical torsion coil portions 46 and may be connected to the console body 14.

Referring to FIG. 1, the motor vehicle 2 has a passenger compartment 58 generally defined by a vehicle body and a pair of front seats 62. The vehicle console assembly 10 is shown as a center console assembly located between the pair of front seats 62. However, the vehicle console assembly 10 may be located elsewhere in the motor vehicle 2 according to other embodiments. The vehicle console assembly 10 has the console body 14 that may be fixedly coupled to the floor 90 of the passenger compartment 58 between the pair of front seats 62 so that it is not moveable and that it may provide a base for the armrest lid 18. The passenger compartment 58 may further include an instrument panel, steering wheel and steering column, shift lever, cup holders, and other features typically found in a passenger compartment 58 of a motor vehicle 2.

Figure 2:
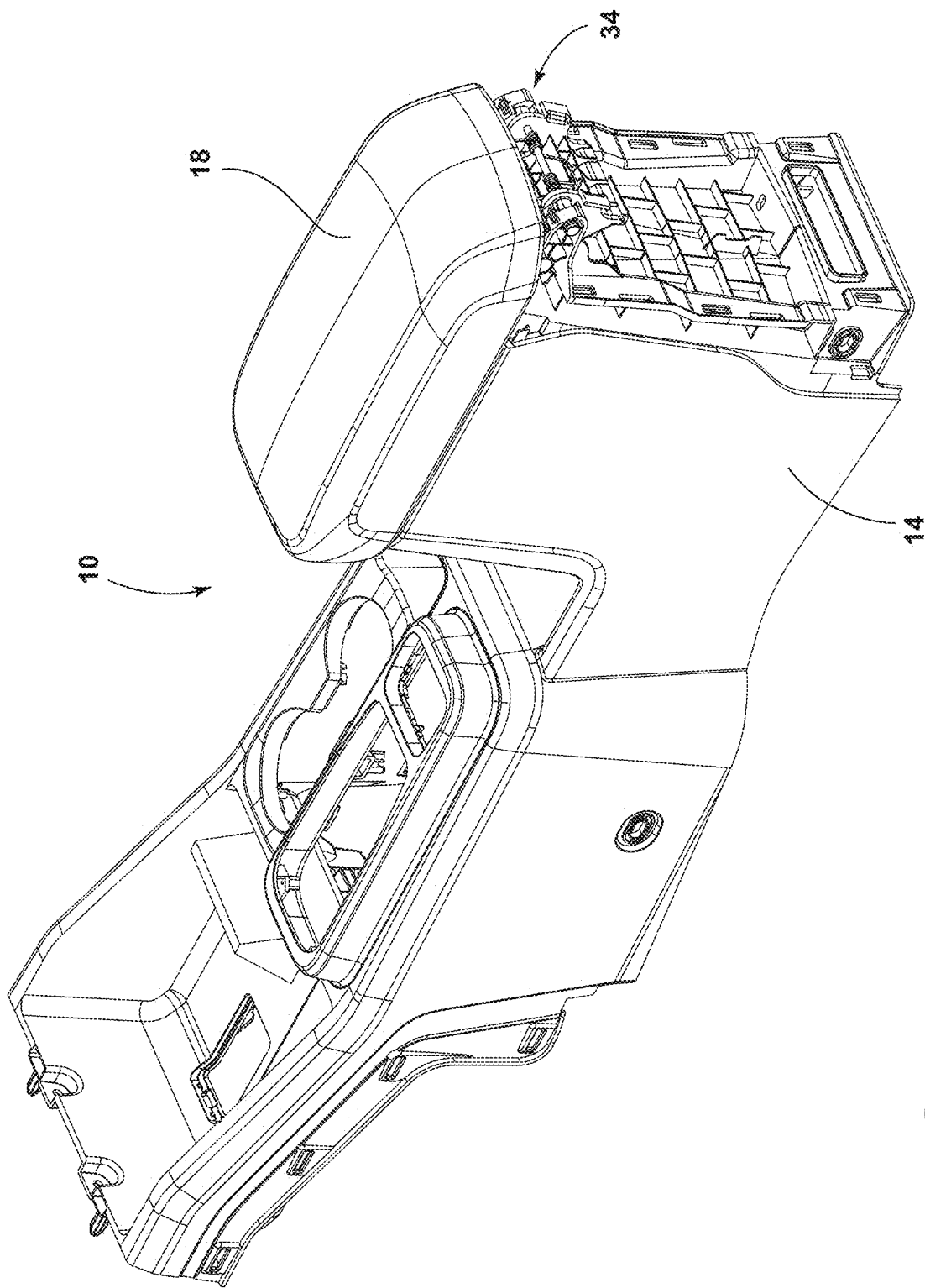
FIG. 2 is a perspective view of a vehicle console assembly having an armrest lid in a closed position.
Figure 3:
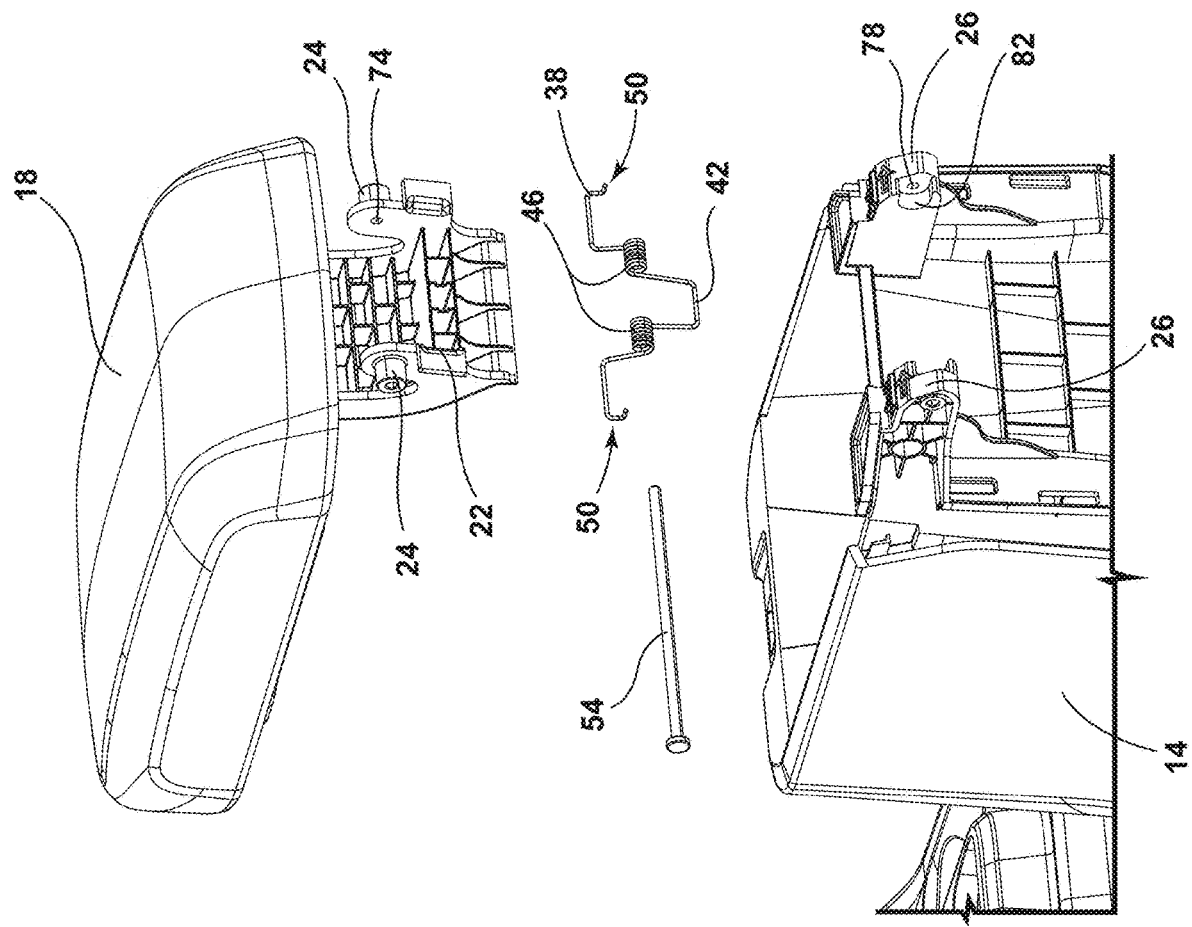
FIG. 3 is an exploded perspective view of the vehicle console assembly.
Figure 4:
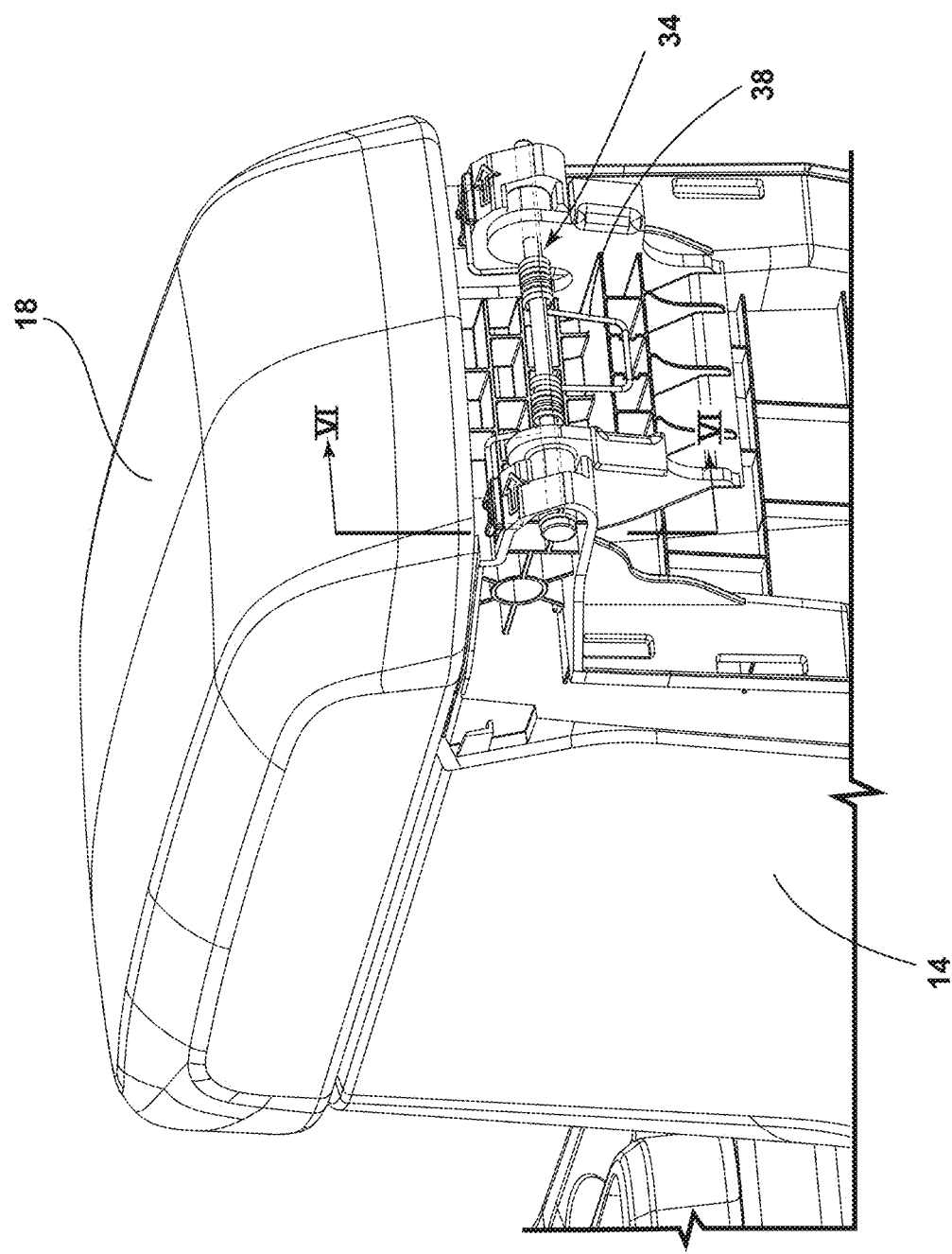
FIG. 4 is a perspective view of the vehicle console assembly having the armrest lid in the closed position and a double torsion spring disengaged in a spring arm engagement portion.
Figure 5:
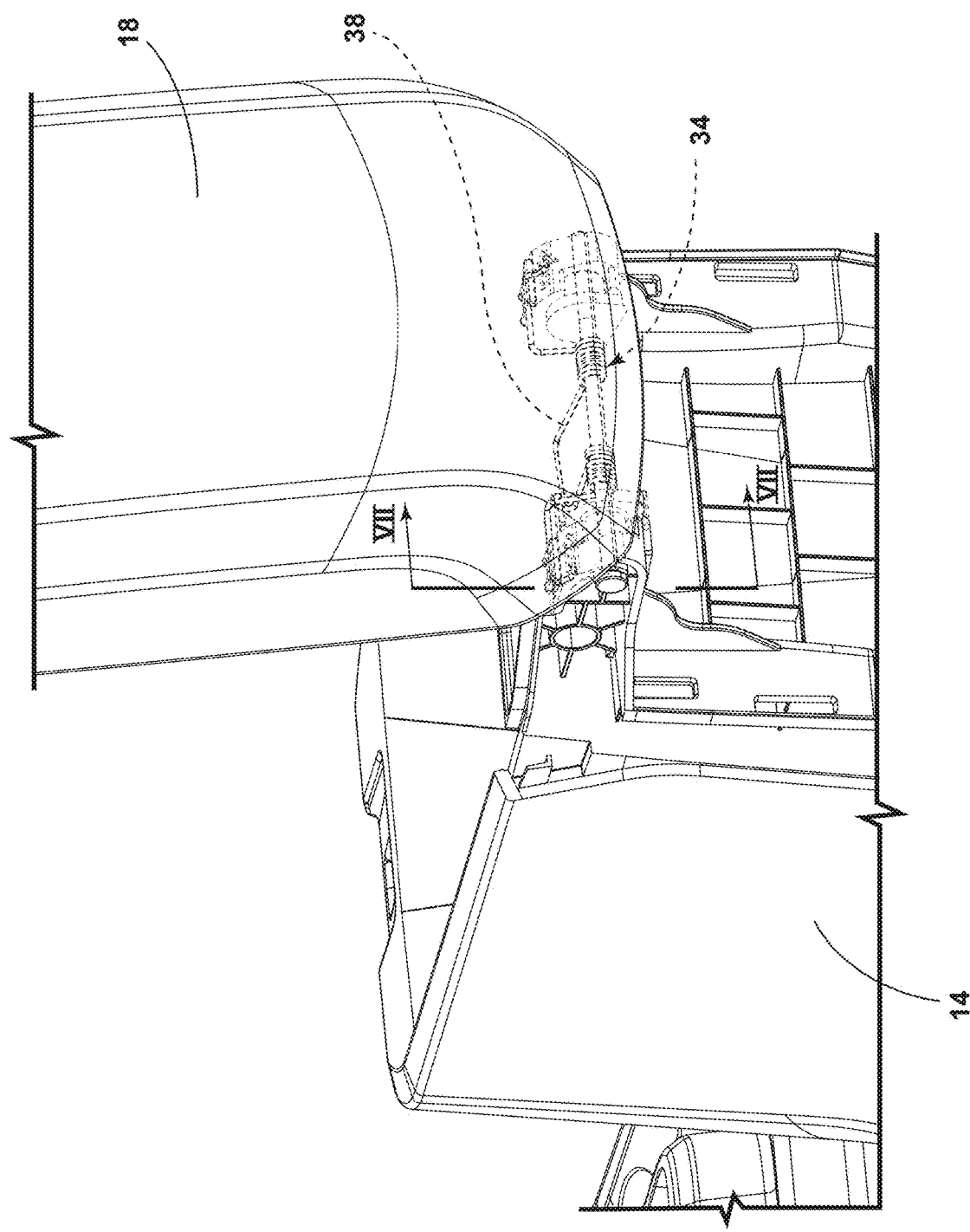
FIG. 5 is a perspective view of the vehicle console assembly having the armrest lid in an open position and the double torsion spring in the engaged position in the spring arm engagement portion.
Figure 7:
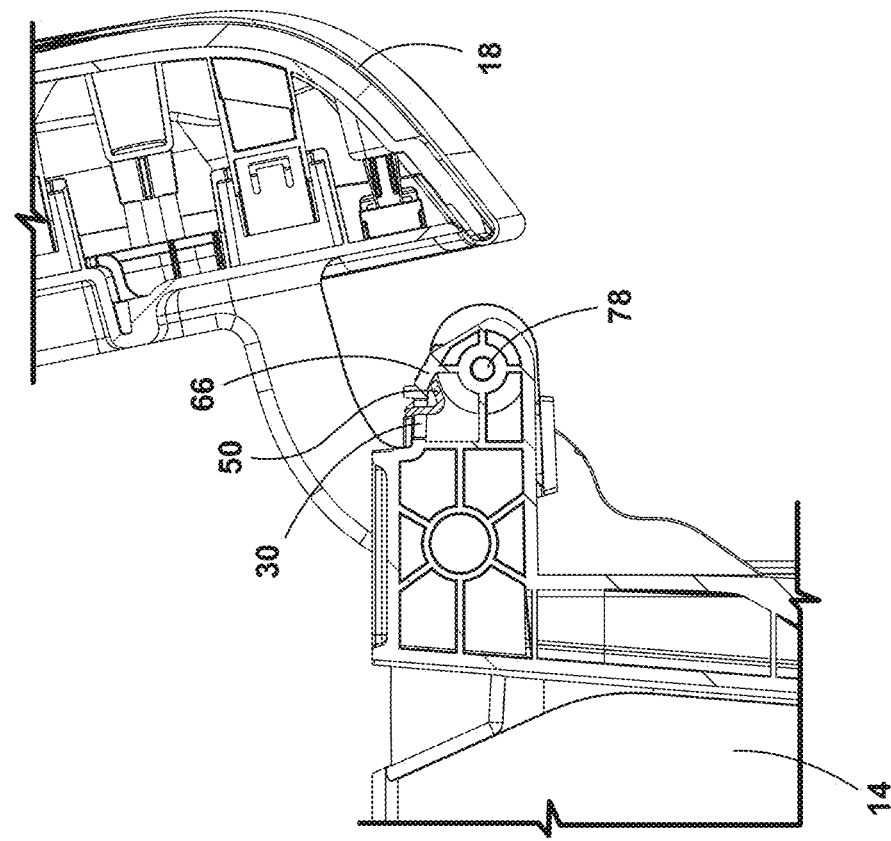
FIG. 7 is a cross-sectional view taken along line VII-VII of FIG. 5.
Figure 6:
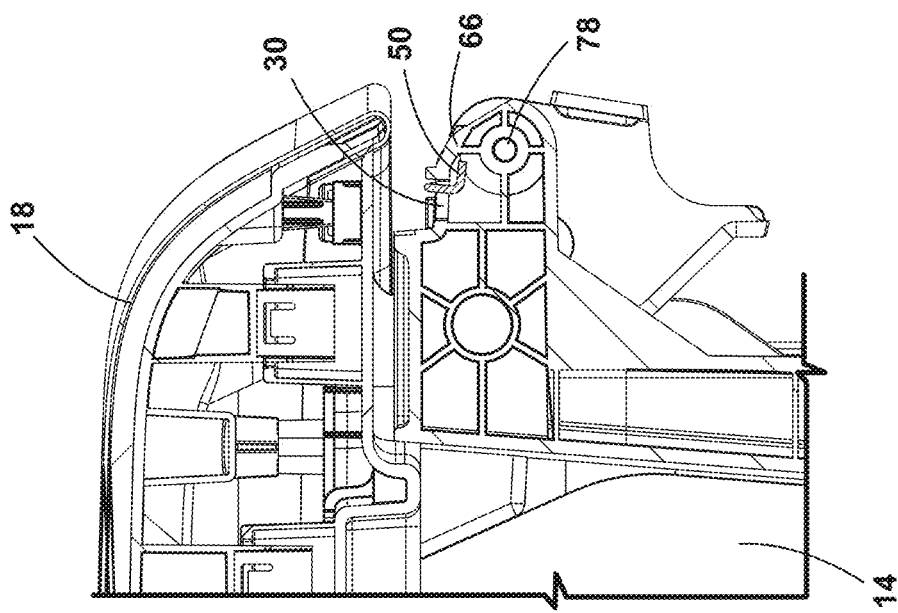
FIG. 6 is a cross-sectional view taken along line VI-VI of FIG. 4.

Referring to FIGS. 2 and 3, the armrest lid 18 may be disposed on the top of the console body 14 and may be rotatably coupled to the console body 14 by a pivotable hinge assembly 34 that may include a double torsion spring 38 and a hinge pin 54. The armrest lid 18 may include an armrest lid engagement portion 22 that interlocks with the center linkage bar 42 of the double torsion spring 38. The armrest lid 18 may include a leather wrap or other soft material wrap to allow for a comfortable contact surface for the occupants of the motor vehicle 2. The armrest lid 18 may also include one or more compartments to store small items that may be accessed by an occupant seated in the front seats 62 of the motor vehicle 2.

Furthermore, the armrest lid 18 may include an armrest lid engagement portion 22. In one embodiment, the armrest lid engagement portion 22 may be configured to accept the center linkage bar 42 of the double torsion spring 38. In some examples, the armrest lid engagement portion 22 may be positioned on a vehicle rearward-facing surface of the armrest lid 18. In other examples, the armrest lid engagement portion 22 may be positioned on a side, bottom, or front facing surface of the armrest lid 18. The armrest lid engagement portion 22 may include a plurality of grooves that accept the center linkage bar 42. In other examples, the armrest lid 18 may include additional features to accept the center linkage bar 42.

The armrest lid 18 may also include a pair of protrusions 24 extending away from the armrest lid 18. The protrusions 24 may be at least one of a shape that rotates about a channel 82 positioned on the console body 14. The protrusions 24 and channel 82 may concentrically align to form an axis that a hinge pin 54 is extended within.

The pivotable hinge assembly 34 may be located rearward on the vehicle console assembly 10 and may allow a user to open the armrest lid 18 from the front of the vehicle console assembly 10. In other examples, the pivotable hinge assembly 34 may be located on a side or front of the vehicle console assembly 10 to allow a user to open the armrest lid 18 from a different orientation. The pivotable hinge assembly 34 provides a rotational axis that the armrest lid 18 may turn about. The pivotable hinge assembly 34 may include a double torsion spring 38 having a pair of helical torsion coil portions 46. In one embodiment, the double torsion spring 38 may include a center linkage bar 42 that is configured to couple with the armrest lid engagement portion 22 disposed on the armrest lid 18. This engagement may allow the double torsion spring 38 to experience maximum tension when the armrest lid 18 is in the closed position. The center linkage bar 42 may be formed in a U or V shape and may extend outward from the helical torsion coil portions 46. The center linkage bar 42 may further be disposed between the pair of helical torsion coil portions 46 and between hook locking features 50 on opposite ends of the double torsion spring arms 70. In various embodiments, the double torsion spring 38 may include a center linkage bar 42 of at least one of a variety of shapes and may be configured to operably couple to at least one of a variety of locations. The double torsion spring 38 may include any suitable material for a double torsion spring 38 as long as the material properties allow the double torsion spring 38 to be used over a multitude of cycles at varying temperatures and conditions without deforming or fracturing.

Referring to FIG. 3, in one embodiment, the double torsion spring 38 may include a pair of helical torsion coil portions 46 that may be turned in opposite rotational directions along the same wire. In another embodiment, the helical torsion coil portions 46 may be turned in a different orientation. Turning the coils in opposite directions may provide for even tension throughout the double torsion spring 38 and may allow the armrest lid 18 to be easily opened by a user within the passenger compartment 58 without one end of the armrest lid 18 experiencing a different tension force than the other end.

Figure 9:
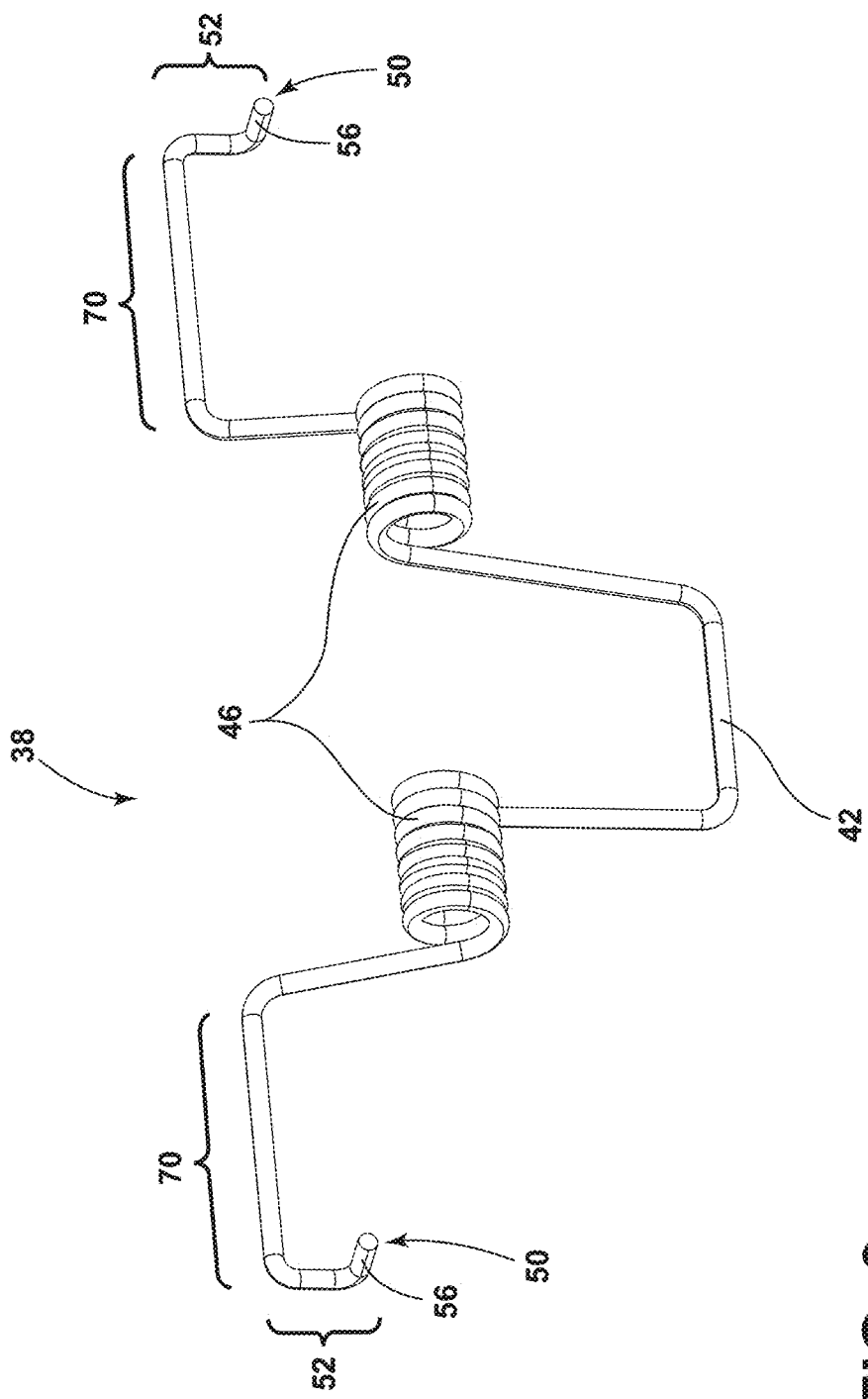
FIG. 9 is a rear perspective view of the double torsion spring showing hooked locking features at each end of the double torsion spring arms.

Referring to FIG. 9, the double torsion spring 38 is illustrated having a pair of hook locking features 50 disposed at opposite ends of the double torsion spring 38. In one embodiment, the first and second hook locking features 50 may be disposed on the outer portion of the helical torsion coil portions 46 and center linkage bar 42 of the double torsion spring 38. The hook locking features 50 each include a first portion 52 bending downward from a horizontal portion of the double torsion spring arms 70 and a second portion 56 bending rearward from the first portion 52. The first and second bending portions may be positioned adjacent to one another on each end of the double torsion spring 38. The angle of the bend may be a right angle. In other embodiments, it may be any angle that operably couples with the spring arm engagement portion 26.

Furthermore, the spring arm engagement portions 26 may include a pair of console body holes 78 that provide endpoints for receiving and supporting the hinge pin 54. Once the double torsion spring 38 has been operably positioned in the vehicle console assembly 10, the helical torsion coil portions 46 may concentrically align with the pair of armrest lid holes 74 and the console body holes 78. The hinge pin 54 may be concentrically extended through the armrest lid holes 74 and may form an axis of rotation for the armrest lid 18.

Referring to FIG. 8, the console body 14 may include a pair of slots 30. In one embodiment, the pair of slots 30 may be positioned on an upper surface of the spring arm engagement portions 26 of the console body 14 so that the hook locking features 50 drop into the spring arm engagement portions 26 when placed through the pair of slots 30. In other embodiments, the pair of slots 30 may be positioned on a front, top, or side face of at least one of the spring arm engagement portions 26 and the console body 14. The pair of slots 30 may be configured to accept the hook locking features 50 at opposite ends of the double torsion spring 38. The slots 30 may be at least one of a variety of shapes that accepts the hook locking features 50 and does not allow the hook locking features 50 to be pulled out of the slots 30 when normal tension is placed on the double torsion spring 38 or when a user jars the vehicle console assembly 10. In one embodiment, the pair of slots 30 may be rectangular. In other embodiments, the pair of slots 30 may be circular or another operable shape.

The console body 14 may also include one or more guides 32. In one embodiment, the guides 32 may be positioned on a top surface of the spring arm engagement portions 26 and may extend away from the spring arm engagement portions 26. In other embodiments, the guides 32 may be positioned on a side surface of the console body 14 or spring arm engagement portions 26 and may extend away from that surface. The one or more guides 32 may be configured to allow the double torsion spring arms 70 to align with the pair of slots 30 above the spring arm engagement portions 26. The one or more guides 32 may be at least one of a variety of shapes that does not inhibit the alignment of the double torsion spring arms 70. In one embodiment, one guide 32 is a U-shaped member and the opposing guide 32 is a rectangular-shaped member. The guides 32 may extend away from a surface at a height that ensures the double torsion spring arms 70 may not be pulled over the guides 32.

As illustrated in FIG. 3, the console body 14 includes at least one channel 82. The channels 82 may be located on each of the spring arm engagement portions 26 in some examples. In other examples, the channels 82 may be located at other positions on the console body 14. The channels 82 may be any one of a variety of shapes defined by the protrusions 24 located on the armrest lid 18 and may form a rotatable joint. The channels 82 may be positioned proximate the console body holes 78 to receive the protrusions 24 of the armrest lid 18.

As illustrated in FIGS. 4-7, the console body 14 includes a pair of spring arm engagement portions 26. The spring arm engagement portions 26 may be positioned on opposite sides of the console body 14. In some examples, the spring arm engagement portions 26 may be configured to rotatably couple the hook locking features 50 of the double torsion spring 38 with the console body 14. During assembly of the pivotable hinge assembly 34 and when the armrest lid 18 is in the closed position, the hook locking features 50 of the double torsion spring 38 may be parallel with and not in contact with a surface 66 of the spring arm engagement portions 26. Once the armrest lid 18 is opened during assembly of the pivotable hinge assembly 34, the hook locking features 50 of the double torsion spring 38 may rotate against the rotation of the armrest lid 18 and may bite into the surface 66 of the spring arm engagement portions 26. This biting action may prevent the armrest lid 18 from over rotating when the armrest lid 18 is fully opened and may prevent the armrest lid 18 from detaching from the console body 14.

The surface 66 of the spring arm engagement portions 26 may be made of a suitable material that does not corrode or deform when the hook locking features 50 bite into the surface 66. In some embodiments, the surface 66 may include a reinforced patch including a robust material that would not decay after a multitude of cycles. The hook locking features 50 may bite into the surface 66, but not slip, bend, break, deform, or dislodge the double torsion spring arms 70 when contacting the surface 66 during normal use. The biting of the hook locking features 50 may prevent the armrest lid 18 from over-rotating and detaching from the console body 14. When the armrest lid 18 has been fully assembled and lowered from the open position to the closed position, the hook locking features 50 may rotate from a contactless position within the spring arm engagement portions 26 to a position in which the hook locking features 50 continuously bite into the surface 66 of the spring arm engagement portions 26.

The armrest lid 18 may be easily opened by a user due to potential energy stored in the tensioned double torsion spring 38. When the armrest lid 18 is in the closed position, the hook locking features 50 may fully bite into a surface 66 of the spring arm engagement portions 26 of the console body 14 and may experience maximum tension. This maximum tension may allow a user to easily open the armrest lid 18, even if heavy objects are stored within the storage compartments under the armrest lid 18. When the armrest lid 18 is in the open position, the hook locking features 50 may contact the surface 66 of the spring arm engagement portion 26 and the double torsion spring 38 may be relaxed. If the armrest lid 18 is not completely closed, the tension in the double torsion spring 38 may cause the armrest lid 18 to rebound to the open position.

The armrest lid 18 may be assembled to the console body 14 using the pivotable hinge assembly 34 according to a method 94 provided in this disclosure. The pivotable hinge assembly 34 may include the double torsion spring 38 and hinge pin 54, but no other parts according to one embodiment. This may allow for a simplified assembly process and may allow for a reduced cycle time, such as twenty seconds or less, to assembly the armrest lid 18 to the console body 14.

Figure 10:
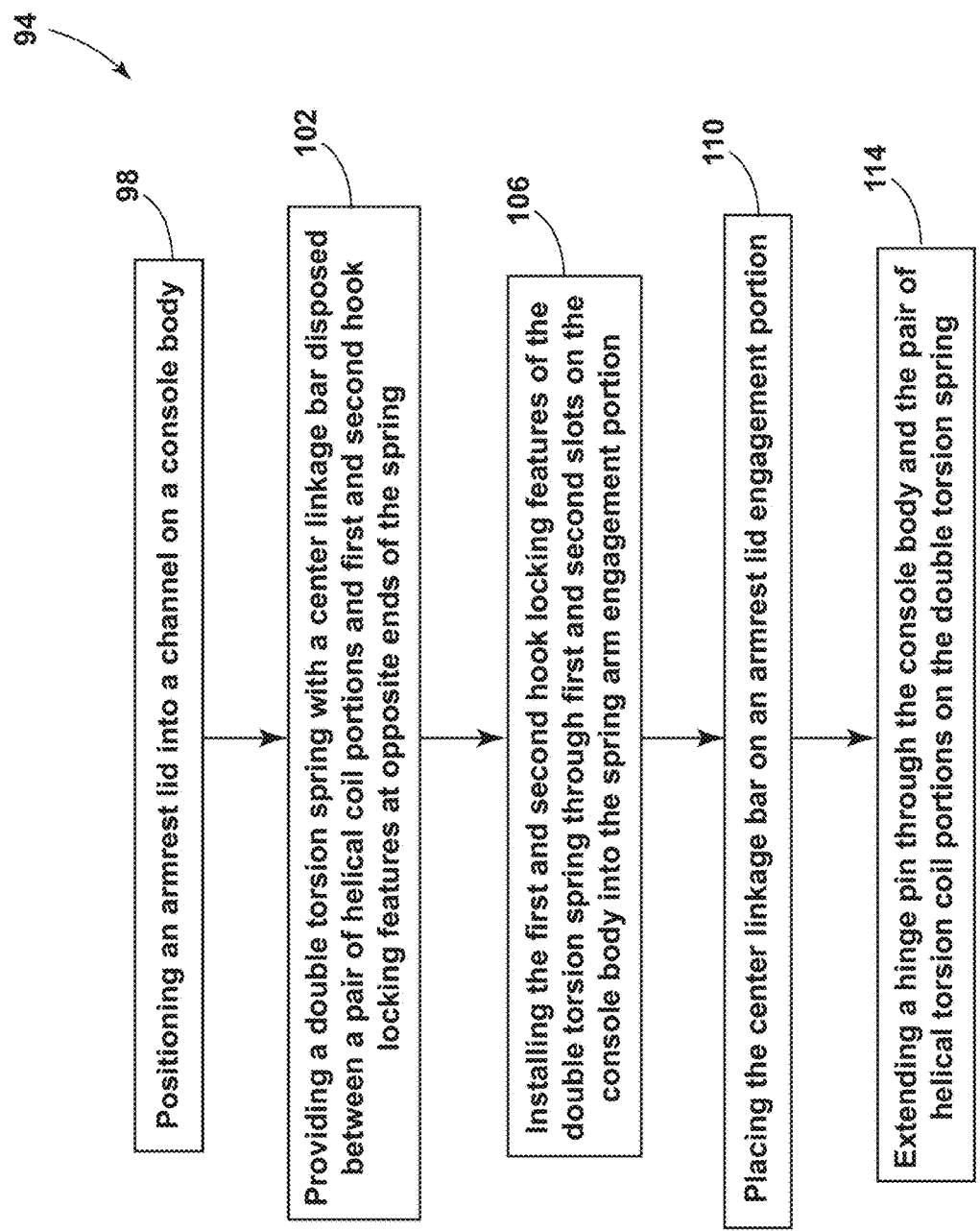
FIG. 10 is a flow diagram of a method for assembling a vehicle console armrest, according to one embodiment.

FIG. 10 depicts a flow chart of a method 94 of assembling a vehicle console assembly 10 of the depicted embodiment. The method 94 may be performed by an equipment assembler such as in an assembly facility or elsewhere. The method 94 includes step 98 which provides for positioning the armrest lid 18 onto a channel 82 on the console body 14 to align the console body holes 78 with the armrest lid holes 74. Step 102 includes providing a double torsion spring 38 with a center linkage bar 42, a pair of helical torsion coil portions 46, and a pair of hook locking features 50 at opposite ends of the double torsion spring 38. Step 106 instructs installing the first and second hook locking features 50 through the pair of slots 30 on the console body 14 so the hook locking features 50 drop into the spring arm engagement portions 26. Step 110 instructs placing the center linkage bar 42 on an armrest lid engagement portion 22 while the armrest lid 18 is opened. Once the center linkage bar 42 has been placed on the armrest lid engagement portion 22, the pair of hook locking features 50 may contact a surface 66 of the spring arm engagement portions 26. Step 114 instructs extending a hinge pin 54 through the console body holes 78 and the pair of helical torsion coil portions 46 disposed on the double torsion spring 38.

The pivotable hinge assembly 34 advantageously may not require any pieces in addition to the double torsion spring 38 and hinge pin 54. The assembly operation may be completed by one operator in a short amount of time due to the lack of pieces required. The pivotable hinge assembly 34 may be assembled in one orientation due to the nature of the hook locking features 50, and hence there is no concern of incorrect assembly. The hinge pin 54 may be inserted from either side of the vehicle console assembly 10, further simplifying the assembly process.

Many modern vehicle armrest assemblies include a plurality of small springs that are difficult to position and assemble in a vehicle console assembly due to the tight position of the center console between a front driver and passenger seat, and the springs being too small for an operator's hands. These vehicle armrest assemblies may require a longer cycle time to assemble, and may create unnecessary operational issues as the small springs and spring clips may easily be misaligned or dislodged when a user jars the vehicle armrest assembly or when an operator misaligns the springs during the assembly process.

Use of the present disclosure provides a variety of advantages. For example, the motor vehicle 2 experiences increased fuel economy because of the weight reductions in the pivotable hinge assembly 34 that may include a double torsion spring 38 and hinge pin 54. The cycle time for assembling the passenger compartment 58 of the motor vehicle 2 may also be reduced. The vehicle console assembly 10 may be assembled either when the console body 14 is already coupled to the floor 90 of the passenger compartment 58, or as a separate assembly that is later added to the passenger compartment 58 of the motor vehicle 2 when the motor vehicle 2 may be on the assembly line. The pivotable hinge assembly 34 decreases the number of possible operational issues during assembly because it may include the double torsion spring 38 and the hinge pin 54, and may not include a plurality of smaller springs that may easily be misaligned or misplaced during the assembly process. The double torsion spring 38 acts as its own mistake proofing apparatus, or poka-yoke, because it may be assembled into the console body 14 in one correct orientation due to the direction of the hook locking features 50 and the position of the center linkage bar 42. Additional benefits or advantages of using this device may also be realized and/or achieved.

According to various examples, a vehicle console assembly includes a console body that includes first and second spring arm engagement portions and a pair of slots. The vehicle console assembly also includes an armrest lid with an armrest lid engagement portion. The vehicle console assembly also includes a pivotable hinge assembly that includes a double torsion spring with a center linkage bar disposed between a pair of helical torsion coil portions and first and second hook locking features at opposite ends of the double torsion spring, and a hinge pin that extends through the pair of helical torsion coil portions and connects to the console body.

Embodiments of the present disclosure may include one or a combination of the following features:
- a console body is fixedly coupled to a passenger compartment floor and is configured to rotatably couple with an armrest lid via a hinge pin extending through a pair of console body holes;
- an armrest lid is rotatably coupled to a console body by a hinge pin extending through a pair of armrest lid holes that align with a pair of console body holes;
- an armrest lid is positioned into at least one channel on a console body to align armrest lid holes with console body holes;
- a double torsion spring includes a center linkage bar that extends outward between a pair of helical torsion coil portions and interlocks with an armrest lid engagement portion;
- a double torsion spring includes a pair of helical torsion coil portions that concentrically align with armrest lid holes and console body holes
- a first hook locking feature includes a first portion extending downward and a second portion extending rearward, a second hook locking feature includes a first portion extending downward and a second portion extending rearward, and the first and second hook locking features are disposed on the ends of double torsion spring arms;
- a first and second hook locking feature each rotatably couple with spring arm engagement portions on a console body and rotate with rotation of an armrest lid and bite into a surface of spring arm engagement portions; and
- a hinge pin extends through consoled body holes, armrest lid holes, and helical torsion coil portions to rotatably couple an armrest lid with a console body and form a pivotable hinge assembly.

According to various examples, a vehicle console and armrest hinge assembly includes a double torsion spring that includes a center linkage bar that extends outward between a pair of helical torsion coil portions and first and second hook locking features disposed on opposite ends of the double torsion spring and configured to be connected to first and second spring arm engagement portions of a vehicle console body, and a hinge pin that extends through the pair of helical torsion coil portions and connects to the console body, further wherein the double torsion spring and hinge pin rotatably couple the armrest lid with the console body and allow the armrest lid to be opened.

Embodiments of the present disclosure may include one or a combination of the following features:
- each end of a double torsion spring includes a hook locking feature that includes a first portion extending downward and a second portion extending rearward;
- each of a double torsion spring ends is configured to be rotatably coupled to a first and second spring arm engagement portions on a console body;
- the first and second hook locking features rotate against the rotation of an armrest lid and prevent over rotation of an armrest lid by biting into a console body;
- first and second hook locking features rotate with the rotation of an armrest lid and prevent an armrest lid from detaching from a console body;
- first and second hook locking features are positioned through first and second slots disposed on the console body;
- a console body includes a surface within a spring arm engagement portion that each of the first and second hook locking features bites into;
- a double torsion spring is configured to be fully tensioned when a center linkage bar is coupled to an armrest lid engagement portion on an armrest lid, when spring ends are positioned in slots on a console body, and when an armrest lid is closed; and
- a double torsion spring is configured to be relaxed when an armrest lid is fully opened.

According to various examples, a method for assembling a vehicle console armrest includes positioning an armrest lid into a channel on a console body in a vehicle, providing a double torsion spring with a center linkage bar disposed between a pair of helical torsion coil portions and first and second hook locking features at opposite ends of the double torsion spring, installing the first and second hook locking features of the double torsion spring through first and second slots on the console body into the spring arm engagement portions, placing the center linkage bar on an armrest lid engagement portion, and extending a hinge pin through the console body and the pair of helical coil portions disposed on the double torsion spring.
- a pivotable hinge assembly includes a double torsion spring and a hinge pin such that no other hinge components are needed.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle console assembly comprising:
   a console body comprising:
      first and second spring arm engagement portions; and
      a pair of slots;
   an armrest lid comprising an armrest lid engagement portion; and
   a pivotable hinge assembly rotatably coupling the armrest lid to the console body and comprising:
      a double torsion spring having a center linkage bar extending outward between a pair of helical torsion coil portions and first and second hook locking features at opposite ends of the double torsion spring extending through the pair of slots and connected to the first and second spring arm engagement portions of the console body, wherein the first and second hook locking features comprise bent portions at terminal ends of the double torsion spring that rotate and bite into a surface of spring arm engagement portions on the console body; and
      a hinge pin extending through the pair of helical torsion coil portions and connecting to the console body.

2. The vehicle console assembly of claim 1, wherein the console body is fixedly coupled to a passenger compartment floor and is configured to rotatably couple with the armrest lid via the hinge pin extending through a pair of console body holes.

3. The vehicle console assembly of claim 1, wherein the armrest lid is rotatably coupled to the console body by the hinge pin extending through armrest lid holes that align with a pair of console body holes.

4. The vehicle console assembly of claim 1, wherein the armrest lid is positioned onto at least one channel on the console body to align the armrest lid holes with the console body holes.

5. The vehicle console assembly of claim 1, wherein the double torsion spring comprises the center linkage bar that extends outward between the pair of helical torsion coil portions and interlocks with the armrest lid engagement portion.

6. The vehicle console assembly of claim 1, wherein the double torsion spring comprises the pair of helical torsion coil portions that concentrically align with the armrest lid holes and console body holes.

7. The vehicle console assembly of claim 1, wherein:
the first hook locking feature comprises a first portion extending downward and a second portion extending rearward;
the second hook locking feature comprises a first portion extending downward and a second portion extending rearward; and
the first and second hook locking features are disposed on the ends of the double torsion spring.

8. The vehicle console assembly of claim 7, wherein the first and second hook locking features rotatably couple with the spring arm engagement portions on the console body and rotate with rotation of the armrest lid and bite into a surface of the spring arm engagement portions.

9. The vehicle console assembly of claim 1, wherein the hinge pin extends through the console body holes, armrest lid holes, and helical torsion coil portions to rotatably couple the armrest lid with the console body and form the pivotable hinge assembly.

10. A vehicle console and armrest hinge assembly, comprising:
a double torsion spring comprising a pair of helical torsion coil portions and a center linkage bar extending outward between the pair of helical torsion coil portions and first and second hook locking features disposed on opposite ends of the double spring and configured to be connected to first and second spring arm engagement portions of a console body, wherein the first and second book locking features rotate against rotation of the armrest lid and prevent over rotation of the armrest lid by biting into a surface of the console body; and
a hinge pin extending through the pair of helical torsion coil portions and connecting to the console body, wherein the double torsion spring and the hinge pin rotatably couple an armrest lid with the console body.

11. The vehicle console and armrest hinge assembly of claim 10, wherein each end of the double torsion spring comprises a hook locking feature that comprises a first portion extending downward and a second portion extending rearward.

12. The vehicle console and armrest hinge assembly of claim 10, wherein each of the first and second hook locking features is configured to be rotatably coupled to the first and second spring arm engagement portions on the console body.

13. The vehicle console and armrest hinge assembly of claim 10, wherein the first and second hook locking features rotate with the rotation of the armrest lid and prevent the armrest lid from detaching from the console body by biting into the surface of the console body.

14. The vehicle console and armrest hinge assembly of claim 10, wherein the first and second hook locking features are positioned through a pair slots disposed on the console body.

15. The vehicle console and armrest hinge assembly of claim 10, wherein the console body comprises a surface within the spring arm engagement portion, and wherein the first and second hook locking features rotate and bite into the surface.

16. The vehicle console and armrest hinge assembly of claim 10, wherein the double torsion spring is configured to be fully tensioned when the center linkage bar is coupled to an armrest lid engagement portion, when the hook locking features are positioned in slots on the console body, and when the armrest lid is closed.

17. The vehicle console and armrest hinge assembly of claim 10, wherein the double torsion spring is configured to be relaxed when the armrest lid is in a fully opened position.

18. A method for assembling a vehicle console armrest lid, the method comprising:
positioning the armrest lid onto a channel on a console body in a vehicle;
providing a double torsion spring comprising a center linkage bar disposed between a pair of helical torsion coil portions and first and second hook locking features disposed on opposite ends of the double torsion spring;
installing the first and second hook locking features of the double torsion spring through a pair of slots on the console body, further wherein the first and second hook locking features are disposed in the spring arm engagement portion of the console body;
placing the center linkage bar of the spring on an armrest lid engagement portion; and
extending a hinge pin through the console body and the pair of helical torsion coil portions disposed on the double torsion spring, wherein the hinge pin and double torsion spring provide a pivotable hinge assembly, and wherein the first and second hook locking features have bent end portions that rotate and bite into a surface, of the spring arm engagement portion of the console body.

19. The method for assembling the vehicle console armrest of claim 18, wherein the pivotable hinge assembly comprises the double torsion spring and the hinge pin such that no other hinge components are needed.

* * * * *

UNITED STATES PATENT AND TRADEMARK OFFICE
CERTIFICATE OF CORRECTION

PATENT NO. : 11,135,956 B2  
APPLICATION NO. : 16/547992  
DATED : October 5, 2021  
INVENTOR(S) : Chen et al.

Page 1 of 1

It is certified that error appears in the above-identified patent and that said Letters Patent is hereby corrected as shown below:

In the Claims

Column 11:  
Claim 10, Line 31;  
"book" should be --hook--.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*